April 6, 1948.  G. L. MOORE  2,439,053
LUBRICATING DEVICE
Filed May 24, 1943

INVENTOR
GEORGE L. MOORE
George R. Ericson
ATTORNEY

Patented Apr. 6, 1948

2,439,053

UNITED STATES PATENT OFFICE 2,439,053

LUBRICATING DEVICE

George L. Moore, Detroit, Mich.

Application May 24, 1943, Serial No. 488,287

4 Claims. (Cl. 134—39)

The invention relates to lubricating devices and particularly to grease cups.

It is an object of the invention to provide a grease cup capable of discharging grease under continuous pressure and to decrease the pressure gradually in a parabolic curve to zero, so that the rate of discharge will be fairly constant during the normal period between refilling.

It is a further object to decrease the rate of discharge after the normal operation between fillings has passed, so that if the grease cup is forgotten, it will not immediately become empty and allow the bearing to become dry, but will feed at a geometrically decreasing rate, supplying less and less grease but never becoming empty, except after a period many times the normal interval between refilling.

It is another object of the invention to produce a grease cup of the character described which is not subject to breakage as a result of too much pressure applied by the grease gun which is used to refill it.

It is a further object of the invention to provide a grease cup which may readily be filled by a high pressure grease gun without the operator taking any particular pains to determine whether the cup is full or not, and yet strong enough to show a substantial resistance to the operation of the gun without breakage of the cup, so that the cup may be filled when covered with dirt or in darkness without danger of the operator leaving the cup either partly filled or breaking it.

It is a further object of the invention to provide a grease cup which, in addition to the advantages pointed out above, provides a relief valve for excess pressure.

It is a further object of the invention to provide a grease cup having a visual indication of the complete filling of the cup.

It is a further object of the invention to provide a grease cup having the above described advantage, and the still further advantage of being capable of continuing to operate and lubricate under widely varying temperature conditions.

The invention will be better understood upon reference to the following description and accompanying drawings, referring to which Figure 1 is a sectional elevation of the grease cup.

Figure 1:
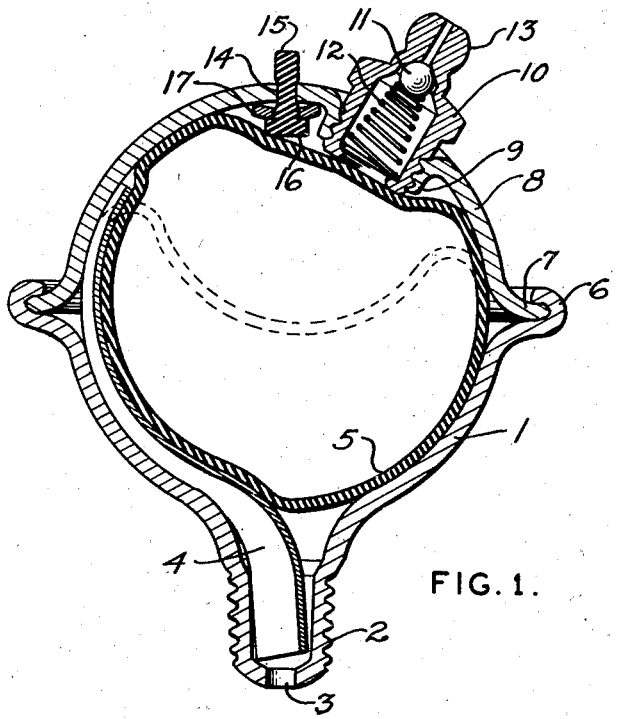
Figure 2:
Figure 2 is an elevation of the discharge trough.

Referring to the drawings, the reference numeral 1 indicates the lower half of the body member which is formed in semi-spherical shape from sheet metal and provided with a screw threaded extension 2 which serves to mount the cup on the bearing which is to be lubricated. This extension is provided with an outlet 3 and is internally formed to receive the lower end of the trough 4 which serves to prevent the outlet from being blocked by the pressure member or ball 5 and also as a channel for transmission of lubricant to the outlet.

Figure 4:
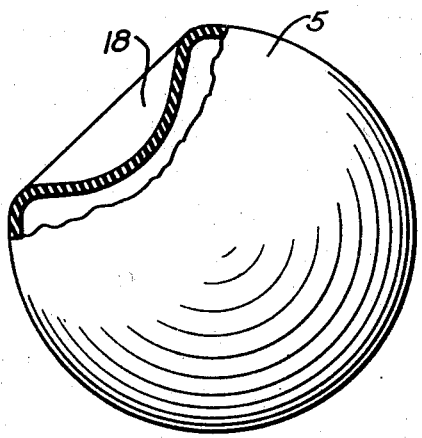
Figure 4 shows a ball which is used as a pressure element.
Figure 3:
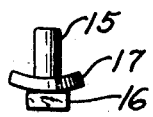
Figure 3 is an elevation of the relief valve.

The ball member 5 is formed of synthetic rubber or other material capable of containing air under pressure without leakage and withstanding the action of the lubricant. An important feature of my invention is that the ball is originally formed with air under subatmospheric pressure, so that, when exposed to ordinary atmospheric pressure and at a temperature of approximately 70° F., the ball is partially collapsed, as indicated by the dimple 18 in Figure 4. This construction and pressure condition may be produced by molding the ball in a hot mold with only atmospheric pressure or comparatively low superatmospheric pressure, so that when the ball cools after molding, the air contracts and produces the dimple 18 in the side of the ball.

The upper part of the body member 1 is formed with a flange 6 which is crimped over the outstanding flange 7 of the upper body member 8, which is also formed from sheet metal with an internal extending screw threaded portion 9 to receive the grease gun fitting 10. This fitting is provided with an inwardly opening check valve 11 normally held in closed position by a spring 12. The fitting is provided with any suitable grease gun attaching surface, such as the spherical portion 13. The cup is adapted to be filled through this grease gun fitting in a well understood manner. The upper body member 8 is provided with an opening 14, which receives the rubber relief valve member 15 which is headed at 16. The head is kept from sealing the opening 14 by means of a bent metal washer 17.

In operation, the cup is attached to the bearing which is to be lubricated by means of the screw threaded portion 2 and filled by means of a pressure grease gun. The ball 5 contains air, originally under subatmospheric pressure, but which is compressed by means of the grease entering the nipple 13. The spherical shape of the receptacle 1—8 permits the application of very high pressure without breakage, so that the operator can tell by the feel of the grease gun when the cup is full, but I prefer to provide the additional visual indicator and relief valve 15 which, under the application of extreme pressure, compresses at the opening 14, permitting the passage of some grease under the washer 17 and out through the opening 14 past the stem of the plug. The escape of grease in this manner gives a visual indication that the cup is full.

Grease cups of this type are normally filled at predetermined intervals, and the cup is designed and calibrated to discharge gradually throughout this period with a decreasing pressure until approximately ½ or ⅓ of the grease is gone. In case the operator forgets to fill the cup at this time, the feeding of grease continues, but at a rapidly decreasing rate on account of the relief of pressure on the air in the ball, which progresses geometrically until the cup produces an empty condition, but does not completely empty the cup or discontinue the supply until several times the normal period between refillings has elapsed. In this way, the life of the bearings, which are lubricated by the cup, is protected, as most bearings will continue to operate without damage as long as the supply of lubricant is continued, even though the rate of supply may greatly decrease below normal.

An important feature of the operation of this invention is in the fact that the dimple 18 still contains a supply of grease after the cup has been discharged to a point that the pressure within the ball is at or below atmospheric under normal temperature conditions. This provides for a reserve supply to be discharged in case the bearing should become overheated, which would result in communication of heat to the air inside the ball and consequent expansion thereof, resulting in a further discharge of lubricant to the bearing to meet the emergency.

The foregoing description and accompanying drawings are intended to be illustrative and not limiting, and the use of all such modifications as come within the scope of the appended claims is contemplated.

I claim:

1. A lubricant cup comprising a pair of substantially semispherical sheet metal members connected together to form a receptacle for lubricant, a gas filled flexible ball arranged within and being shaped to closely conform to the interior contour of said receptacle, and a trough member extending into the outlet of said receptacle and acting as a channel for transmission of lubricant to said outlet.

2. A lubricating device comprising a spherical container having a flexible ball arranged therewithin and being shaped to closely conform to the interior contour of said container, said ball being formed with a depression therein providing a receptacle for lubricant and containing air under sub-atmospheric pressure at 70° F. except when compressed by the introduction of lubricant into the container, part of said lubricant being retained in said receptacle as a reserve supply at normal operating temperatures and being discharged as an emergency supply upon an abnormal rise in temperature expanding the air within said ball.

3. A lubricating device comprising a spherical container having a flexible ball arranged therewithin and being shaped to closely conform to the interior contour of said container, said ball being formed with a depression when the air therein is at normal temperatures providing a receptacle for retaining a reserve supply of lubricant, said lubricant being discharged as an emergency supply upon an abnormal rise in temperature expanding the air within said ball.

4. A lubricating device comprising a spherical container having a discharge outlet, a flexible ball arranged within and being shaped to closely conform to the interior contour of said container, said ball being formed with a depression when the air therein is at normal temperatures providing a receptacle for retaining a reserve supply of lubricant, and a trough member extending into said outlet and acting as a channel for the transmission of lubricant to said outlet, said lubricant being discharged as an emergency supply upon an abnormal rise in temperature expanding the air within said ball.

GEORGE L. MOORE.

REFERENCES CITED

The following references are of record in the file of this patent:

UNITED STATES PATENTS

| Number | Name | Date |
|---|---|---|
| 146,697 | McCoy | Jan. 20, 1874 |
| 1,015,626 | Lewis | Jan. 23, 1912 |
| 1,673,399 | Cutting | June 12, 1928 |
| 1,696,774 | Martin | Dec. 25, 1928 |
| 1,950,134 | Bradbury | Mar. 16, 1934 |
| 2,031,368 | Hodson | Feb. 18, 1936 |
| 2,235,897 | Moore | Mar. 25, 1941 |